(12) United States Patent
Colley et al.

(10) Patent No.: US 9,082,114 B2
(45) Date of Patent: Jul. 14, 2015

(54) SELF-SERVICE TERMINAL

(75) Inventors: Andrew Colley, Dundee (GB); Stephen W. Swaine, Dunkeld (GB)

(73) Assignee: NCR Corporation, Duluth, GA (US)

( * ) Notice: Subject to any disclaimer, the term of this patent is extended or adjusted under 35 U.S.C. 154(b) by 450 days.

(21) Appl. No.: 13/194,493

(22) Filed: Jul. 29, 2011

(65) Prior Publication Data

US 2013/0030998 A1 Jan. 31, 2013

(51) Int. Cl.
*G06K 15/00* (2006.01)
*G06Q 40/00* (2012.01)
*G07D 11/00* (2006.01)
*G07F 19/00* (2006.01)
*G07B 15/02* (2011.01)
*G06Q 20/18* (2012.01)

(52) U.S. Cl.
CPC ............... *G06Q 20/18* (2013.01); *G07F 19/20* (2013.01); *G07F 19/205* (2013.01)

(58) Field of Classification Search
CPC ........ G06Q 20/21; G06Q 20/20; G07F 19/20; G07F 19/00; G07F 19/205; G07F 19/201; G07G 1/00; G07G 1/0018; G07G 1/0036
USPC ......... 235/383, 384, 378, 379; 705/43, 35, 73
See application file for complete search history.

(56) References Cited

U.S. PATENT DOCUMENTS

| | | | | |
|---|---|---|---|---|
| 4,423,316 A | * | 12/1983 | Sano et al. | 235/379 |
| 4,608,485 A | * | 8/1986 | Miura | 235/379 |
| 4,735,289 A | * | 4/1988 | Kenyon | 186/37 |
| 4,797,540 A | * | 1/1989 | Kimizu | 235/383 |
| 4,819,866 A | * | 4/1989 | Kenyon | 232/43.3 |
| 4,902,881 A | * | 2/1990 | Janku | 235/381 |
| 4,923,154 A | * | 5/1990 | Konkel | 248/131 |
| 4,988,851 A | * | 1/1991 | Kohno et al. | 186/61 |
| 5,072,246 A | * | 12/1991 | Thayer et al. | 396/2 |
| D323,648 S | * | 2/1992 | Yamamoto | D18/12.3 |
| 5,088,586 A | * | 2/1992 | Isobe et al. | 194/205 |
| 5,153,585 A | * | 10/1992 | Negishi et al. | 340/870.28 |
| 5,311,302 A | * | 5/1994 | Berry et al. | 348/14.03 |
| 5,412,191 A | * | 5/1995 | Baitz et al. | 705/5 |
| 5,492,199 A | * | 2/1996 | Shimoyama | 186/61 |
| 5,588,727 A | * | 12/1996 | D'Agaro et al. | 312/283 |
| 5,644,119 A | * | 7/1997 | Padula et al. | 235/384 |
| 5,943,241 A | * | 8/1999 | Nichols et al. | 700/232 |
| 5,952,642 A | * | 9/1999 | Lutz | 235/383 |
| 5,992,570 A | * | 11/1999 | Walter et al. | 186/36 |
| 6,042,007 A | * | 3/2000 | Nugent et al. | 235/383 |
| 6,061,666 A | * | 5/2000 | Do et al. | 705/43 |
| 6,073,838 A | * | 6/2000 | Baitz et al. | 235/380 |
| 6,167,381 A | * | 12/2000 | Swaine et al. | 705/17 |
| 6,241,149 B1 | * | 6/2001 | Baitz et al. | 235/7 R |
| 6,243,473 B1 | * | 6/2001 | Azima et al. | 381/152 |
| 6,266,236 B1 | * | 7/2001 | Ku et al. | 361/679.27 |
| 6,269,753 B1 | * | 8/2001 | Roddan | 108/50.01 |
| 6,296,184 B1 | * | 10/2001 | Dejaeger | 235/383 |
| 6,354,497 B1 | * | 3/2002 | Lippert et al. | 235/383 |
| 6,629,636 B1 | * | 10/2003 | Hayashi et al. | 235/383 |
| 7,644,039 B1 | * | 1/2010 | Magee et al. | 705/43 |

(Continued)

*Primary Examiner* — Daniel Walsh
(74) *Attorney, Agent, or Firm* — Paul W. Martin (57) ABSTRACT

A self-service terminal comprising: a terminal body defining a transaction fulfillment area, and a terminal head. The terminal head extends from the terminal body and defines a transaction request area transverse to the transaction fulfillment area. The transaction request area and transaction fulfillment area create a customer zone.

14 Claims, 7 Drawing Sheets

(56) References Cited

U.S. PATENT DOCUMENTS

| | | | |
|---|---|---|---|
| 8,061,612 B2* | 11/2011 | Yamada et al. | 235/454 |
| 8,317,088 B2* | 11/2012 | Yoneda | 235/379 |
| 8,462,103 B1* | 6/2013 | Moscovitch et al. | 345/156 |
| 8,800,863 B2* | 8/2014 | Colley | 235/379 |
| 8,825,531 B1* | 9/2014 | Catoe | 705/16 |
| 2001/0020641 A1* | 9/2001 | Miyazawa et al. | 235/383 |
| 2002/0004781 A1* | 1/2002 | Forsyth | 705/39 |
| 2002/0082962 A1* | 6/2002 | Farris et al. | 705/35 |
| 2003/0001007 A1* | 1/2003 | Lee et al. | 235/383 |
| 2003/0024982 A1* | 2/2003 | Bellis et al. | 235/383 |
| 2003/0060270 A1* | 3/2003 | Binkley et al. | 463/20 |
| 2003/0115103 A1* | 6/2003 | Mason | 705/16 |
| 2003/0116621 A1* | 6/2003 | Duncan | 235/379 |
| 2003/0116687 A1* | 6/2003 | Oddsen, Jr. | 248/279.1 |
| 2004/0041021 A1* | 3/2004 | Nugent, Jr. | 235/383 |
| 2004/0069848 A1* | 4/2004 | Persky | 235/383 |
| 2004/0220860 A1* | 11/2004 | Persky et al. | 705/23 |
| 2004/0222286 A1* | 11/2004 | Douglass et al. | 235/381 |
| 2005/0062238 A1* | 3/2005 | Broadfield et al. | 280/1 |
| 2005/0269405 A1* | 12/2005 | Throckmorton et al. | 235/383 |
| 2006/0198094 A1* | 9/2006 | Kano et al. | 361/683 |
| 2006/0266824 A1* | 11/2006 | Hassenbuerger | 235/383 |
| 2006/0289628 A1* | 12/2006 | Gunst et al. | 235/379 |
| 2007/0069011 A1* | 3/2007 | Barton et al. | 235/381 |
| 2007/0138269 A1* | 6/2007 | Baitz et al. | 235/383 |
| 2007/0159784 A1* | 7/2007 | Chen et al. | 361/683 |
| 2007/0233572 A1* | 10/2007 | Knowles et al. | 705/22 |
| 2007/0247792 A1* | 10/2007 | Yang | 361/681 |
| 2007/0252003 A1* | 11/2007 | Goldring et al. | 235/381 |
| 2007/0255665 A1* | 11/2007 | Oosugi et al. | 705/414 |
| 2008/0006649 A1* | 1/2008 | Masters et al. | 221/154 |
| 2008/0024964 A1* | 1/2008 | Lev et al. | 361/681 |
| 2008/0048029 A1* | 2/2008 | Crockett et al. | 235/383 |
| 2008/0068634 A1* | 3/2008 | Takano et al. | 358/1.13 |
| 2009/0101718 A1* | 4/2009 | Knowles et al. | 235/462.42 |
| 2009/0114730 A1* | 5/2009 | Tashiro | 235/7 A |
| 2009/0250519 A1* | 10/2009 | Yamada et al. | 235/454 |
| 2009/0273539 A1* | 11/2009 | Pruett | 345/1.1 |
| 2009/0289104 A1* | 11/2009 | Yoneda | 235/375 |
| 2009/0289105 A1* | 11/2009 | Block et al. | 235/379 |
| 2009/0307097 A1* | 12/2009 | De Faria | 705/17 |
| 2010/0127077 A1* | 5/2010 | Ueda | 235/383 |
| 2010/0140357 A1* | 6/2010 | Roslak et al. | 235/462.43 |
| 2010/0200656 A1* | 8/2010 | Marshall et al. | 235/383 |
| 2010/0211471 A1* | 8/2010 | Haibara | 705/21 |
| 2011/0089234 A1* | 4/2011 | Iida | 235/383 |
| 2011/0126264 A1* | 5/2011 | Dunstan | 726/3 |
| 2011/0166947 A1* | 7/2011 | Lum | 705/17 |
| 2011/0215147 A1* | 9/2011 | Goncalves | 235/383 |
| 2011/0259952 A1* | 10/2011 | Yamada et al. | 235/375 |
| 2011/0266092 A1* | 11/2011 | Marquis et al. | 186/61 |
| 2012/0074218 A1* | 3/2012 | Walsh | 235/380 |
| 2012/0078650 A1* | 3/2012 | Hussam | 705/2 |
| 2012/0193407 A1* | 8/2012 | Barten | 235/375 |
| 2013/0030998 A1* | 1/2013 | Colley et al. | 705/43 |
| 2013/0223682 A1* | 8/2013 | Sugasawa et al. | 382/103 |
| 2013/0327835 A1* | 12/2013 | Thompson et al. | 235/470 |
| 2014/0265460 A1* | 9/2014 | Voigt et al. | 297/61 |

* cited by examiner

SELF-SERVICE TERMINAL

FIELD OF INVENTION

The present invention relates to a self-service terminal (SST), such as an automated teller machine (ATM).

BACKGROUND OF INVENTION

ATMs are commonplace and provide a reliable, quick, and secure mechanism for withdrawing cash and performing other financial transactions. However, not everyone uses ATMs. For example, some people are not confident that they can operate an ATM correctly, perhaps due to a visual, physical, or cognitive impairment. The traditional ATM design may not help such people to use ATMs, even when an ATM is located in a bank branch, because it is difficult to ask a member of staff for help without leaving the ATM. People in wheelchairs may also have difficulty using an ATM because some of the user interface elements may be too far away to be comfortably reached from a sitting position.

SUMMARY OF INVENTION

Accordingly, the invention generally provides an improved self-service terminal having a dispensing area within the terminal body, and a display extending from the terminal body transverse to the dispensing area.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a self-service terminal comprising: a terminal body defining a transaction fulfillment area, and a terminal head extending from the terminal body and defining a transaction request area transverse to the transaction fulfillment area to create a customer zone defined on one side by the transaction fulfillment area and on another side by the transaction request area.

The terminal body may comprise a security enclosure (such as a safe) defining apertures for media transfer. The security enclosure may be encased by a fascia defining closable apertures aligning with apertures defined by the security enclosure.

The security enclosure may house a media dispenser aligned with a media dispense aperture; and/or a media depository aligned with a media deposit aperture; and/or a media recycler. The media may comprise currency, checks, coupons, vouchers, passes, statement paper, and the like.

The security enclosure may comprise a traditional ATM security enclosure.

The transaction fulfillment area may comprise a plurality of apertures defined by the fascia and all located on substantially the same plane (the fulfillment plane).

The terminal body may extend from a floor level to approximately waist-high for an average adult person, and may provide an upper surface that can be used as a table surface. This enables the terminal body to be integrated into office furniture, such as bank branch furniture (for example, a teller counter). This would enable a teller on one side of the terminal body to speak directly (over the terminal body) to a customer using the terminal and located on the other side of the terminal body.

The terminal head may be coupled to the terminal body either directly or indirectly. Indirect coupling may occur by connecting the terminal head to a sidecar that is connected (bolted, welded, screwed, or the like) to the terminal body.

The terminal head may be coupled to the terminal body (whether directly or indirectly) by an arm. The terminal head may be cantilevered from the terminal body by the arm (without resting on a floor or a base). One advantage of the terminal head being cantilevered is that a customer in a wheelchair can put their knees beneath the terminal head, thereby making use of the terminal head more comfortable. Alternatively, the terminal head may include a ground support.

The arm may comprise a channel through which power and signal connections are routed to connect a power supply in the terminal body with the terminal head.

The arm may house a receipt printer and may define a receipt aperture through which receipts are provided to a customer.

The arm may include a coin dispenser.

The terminal head may comprise: a display, a touch-sensitive panel overlying the display and in registration therewith, a token reader, and an encrypting keypad.

The token reader may comprise a card reader (motorized, dip, or swipe), a near field communications reader (NFC reader), or the like.

The terminal head may be oriented at an angle to vertical. The terminal head may include a pivot to enable a customer to change the vertical angle.

The terminal head provides a transaction request area in substantially one plane (the request plane). The request plane is transverse to the fulfillment plane. The terminal head may be adjustable horizontally to allow the customer to change the angle between the request plane and the fulfillment plane. Alternatively, the terminal head may be fixed so that horizontal adjustment is not possible. The request plane may be located at an angle between approximately 60 degrees and 140 degrees to the fulfillment plane. In some embodiments, an angle between the request plane and the fulfillment plane between approximately 70 degrees and 120 degrees may be used.

The terminal head may include a privacy shield transverse to the request plane. The privacy shield may comprise opaque thermoplastic. The privacy shield may be disposed orthogonally to the request plane.

The terminal may comprise an automated teller machine (ATM).

According to a second aspect there is provided a method of providing a transaction at a self-service terminal, the method comprising: receiving transaction instructions at a transaction request area of a terminal head; conveying the received transaction instructions to a terminal body spaced from the terminal head; obtaining authorization for the transaction; and fulfilling the transaction at a transaction fulfillment area of the terminal body, where the transaction fulfillment area is transverse to the transaction request area.

The method may comprise the further step of providing an indication on the transaction request area to direct a customer to the transaction fulfillment area to fulfill the transaction.

According to a third aspect there is provided a bank branch comprising a plurality of self-service terminals according to the first aspect, each self-service terminal body being integrated into a teller position.

It should be appreciated that the self-service terminal may be operated entirely by a customer, or the customer may receive assistance from a teller or other authorized person. In other words, the terminal may be used in a pure self-service mode or in an assisted self-service mode.

These and other aspects will be apparent from the following specific description, given by way of example, with reference to the accompanying drawings.

DETAILED DESCRIPTION

Figure 1:
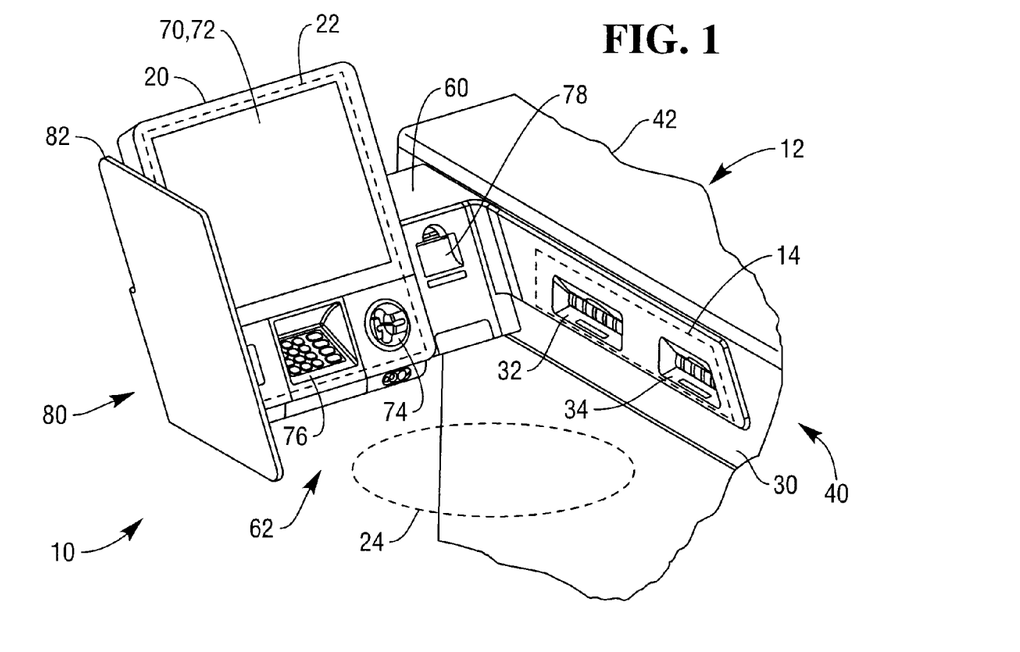
FIG. 1 is a pictorial front perspective view of a self-service terminal according to one embodiment of the present invention.
Figure 2:
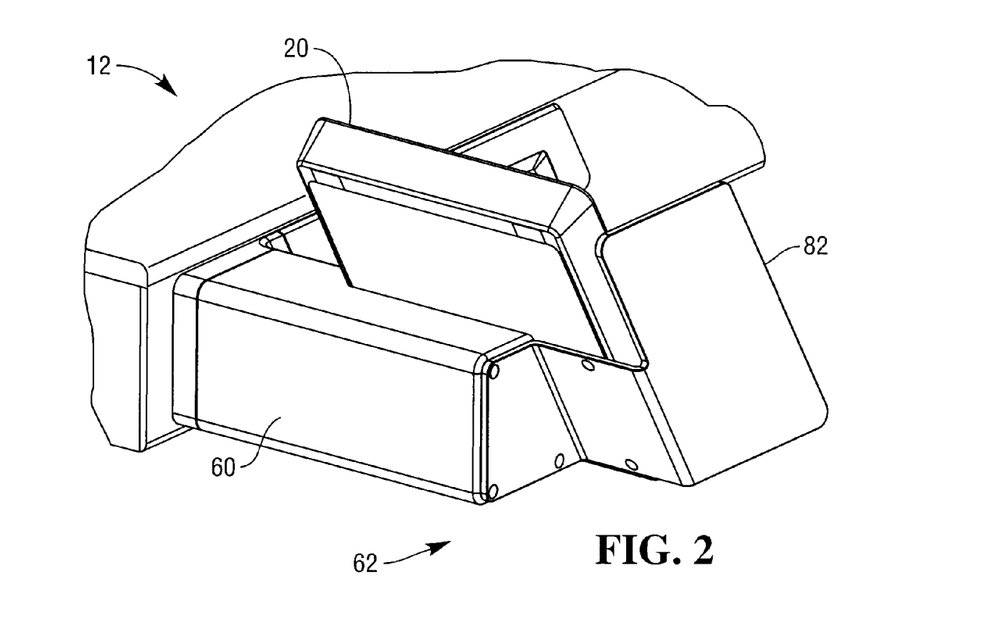
FIG. 2 is a pictorial rear perspective view of the terminal of FIG. 1.
Figure 3:
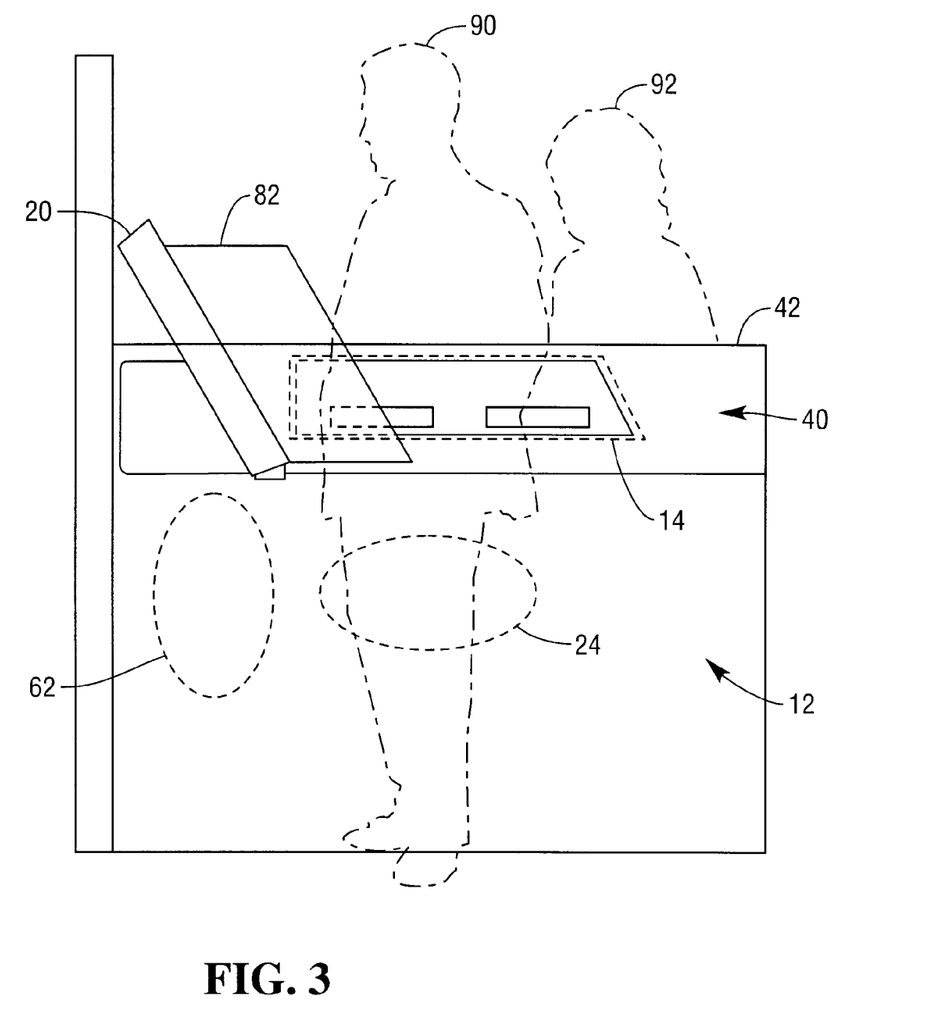
FIG. 3 is a pictorial front view of the terminal of FIG. 1.
Figure 4:
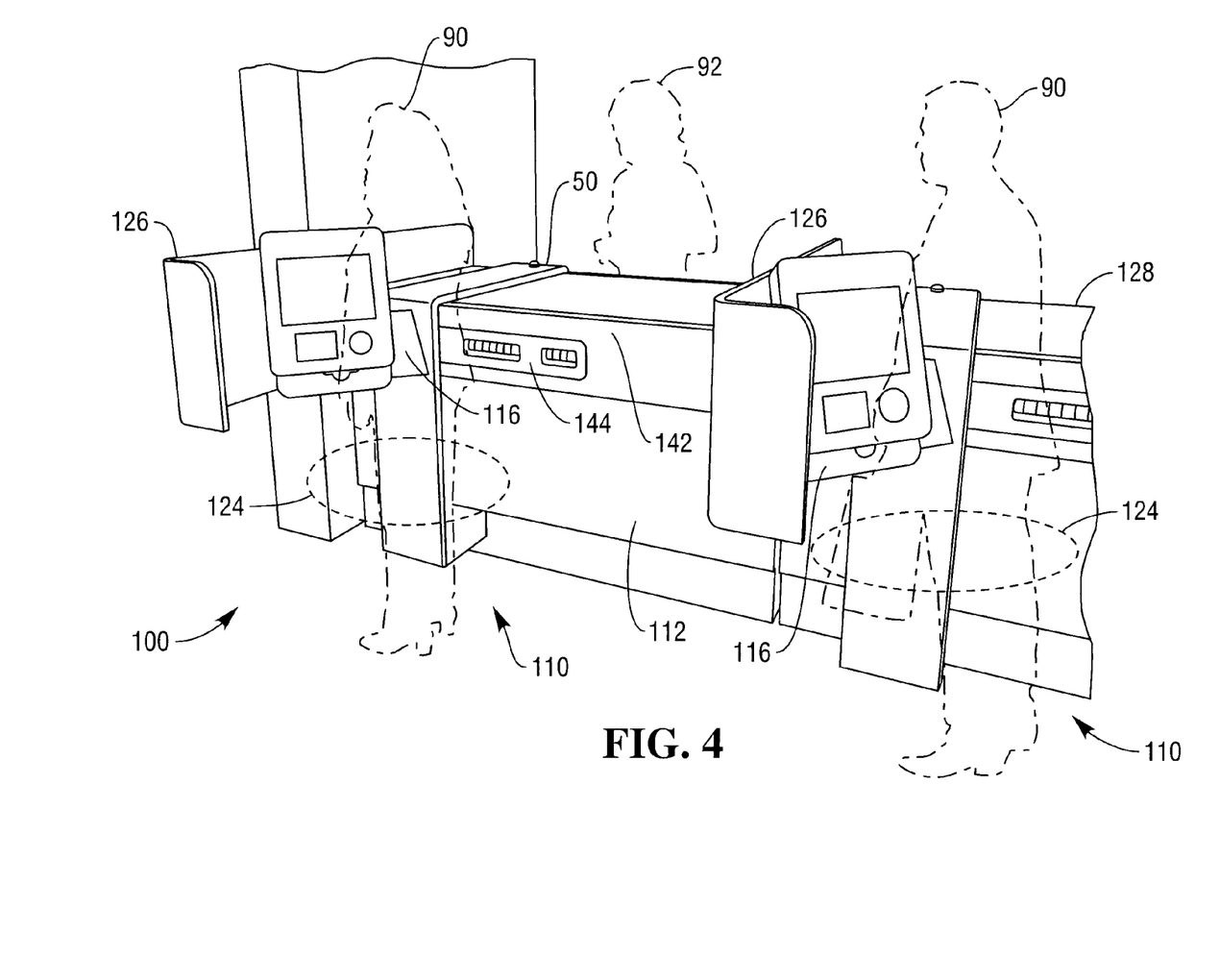
FIG. 4 is a pictorial front view of a bank teller area including a counter into which two terminals similar to the type shown in FIG. 1 are integrated.
Figure 5:
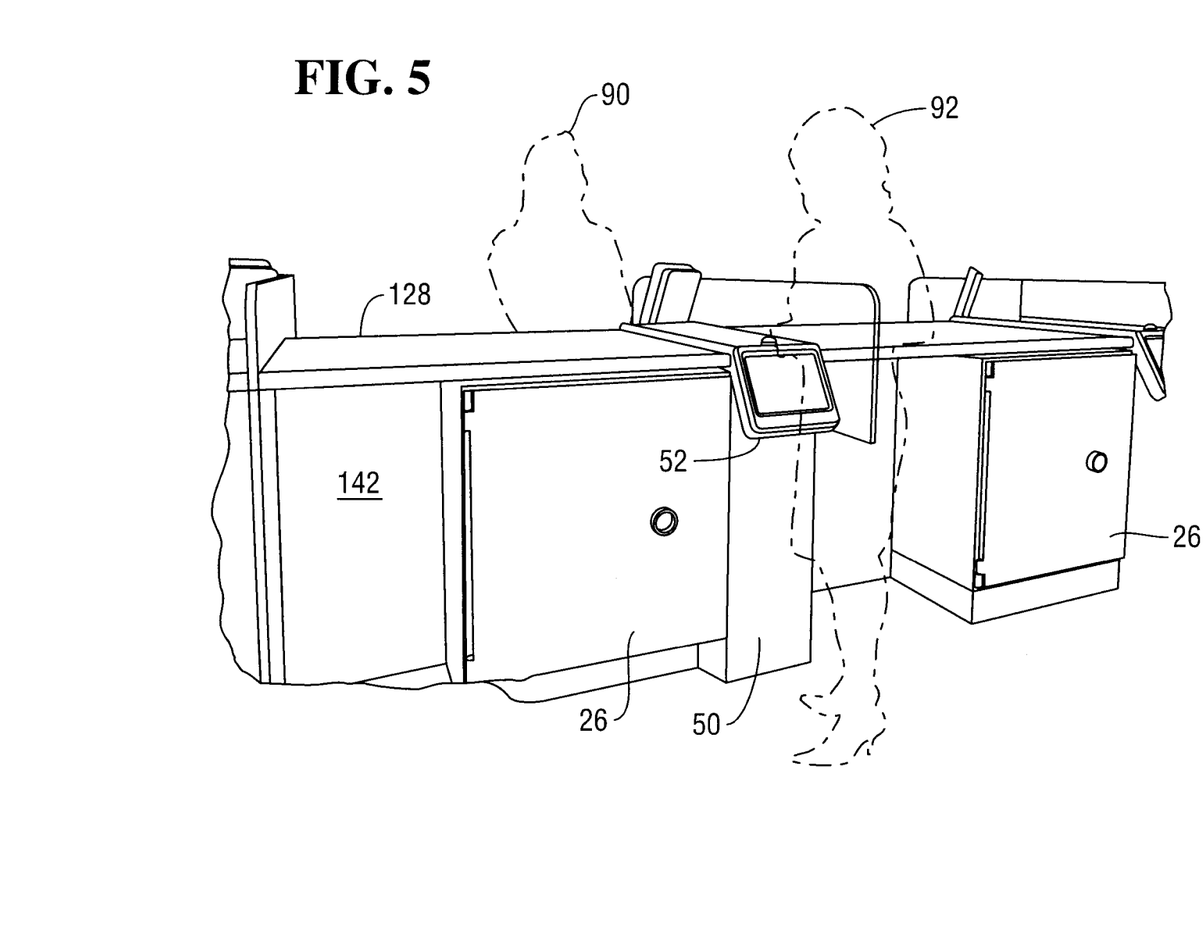
FIG. 5 is a pictorial rear view of the bank teller area of FIG. 4.

Reference is now made to the Figures. FIGS. 1 to 3 show a first embodiment, and FIGS. 4 and 5 show a second embodiment, very similar to the first embodiment. Many features of the first embodiment are common to the second embodiment, but may be more clearly visible on the second embodiment, so the description of the first embodiment may refer to features only visible on the second embodiment.

FIG. 1 is a pictorial front perspective view of a self-service terminal (SST) 10 according to one embodiment of the present invention. The SST 10 is in the form of an ATM. The ATM 10 comprises a terminal body 12 defining a transaction fulfillment area (indicated generally by broken line 14), and a terminal head 20 extending in a horizontal direction from the terminal body 12 and defining a transaction request area (indicated by arrow 22) transverse to the transaction fulfillment area 14. A customer zone (indicated generally by broken ellipse 24) is defined on one side by the transaction fulfillment area 14 and on another side by the transaction request area 22.

The terminal body 12 comprises a security enclosure 26 (see FIG. 5), in the form of a safe, defining apertures (not shown) for media transfer. The safe 26 is encased by a fascia 30 defining closable apertures 32,34 aligning with apertures (not shown) defined by the safe 26. Aperture 32 is a dispense aperture aligning with a currency dispenser (not shown) located in the safe 26; whereas, aperture 34 is a deposit aperture aligning with a depository (for banknotes and checks) located in the safe 26.

The terminal body 12 is very similar to a conventional ATM safe covered with an aesthetic cladding. The modules located within the terminal body 12 (such as a currency dispenser and a depository), the fascia apertures 32,34, and the safe apertures (not shown), are identical (or very similar) to those used in conventional ATMs.

The apertures 32,34 comprise the user interface elements at the transaction fulfillment area 14, and are located on the same plane 40 (referred to as the fulfillment plane).

The terminal body 12 is approximately waist-high for an average adult person (best seen in FIGS. 3 and 4), and provides an upper surface 42 that can be used as a teller surface. This enables the terminal body 12 to be integrated into office furniture, such as bank branch furniture (in this embodiment, a teller counter).

The terminal body 12 includes a sidecar 50 (only visible in FIGS. 4 and 5) connected to the safe 26 by bolts. In FIGS. 1 to 3 the sidecar 50 is covered by the fascia 30 and upper surface 42. A teller display 52 is mounted on a rear side of the sidecar 50 (best seen in FIG. 5). The teller display 52 allows a teller to monitor the status of transactions at the terminal head 20.

The terminal head 20 is coupled to the terminal body 12 by an arm 60. The terminal head 20 is cantilevered from the terminal body 12 by the arm 60. The terminal head 20 does not include any support or stand beneath the terminal head 20 but is supported entirely by the terminal body 12 via the arm 60.

One advantage of the terminal head 20 being cantilevered is that the terminal head 20 defines a knee well 62 thereunder. This allows a customer in a wheelchair to put their knees into the knee well 62 beneath the terminal head 20, thereby making use of the terminal head 20 more comfortable.

The arm 60 defines a channel therethrough (not shown). Power and signal connections are routed through this channel (not shown) to connect a conventional power supply (not shown) in the terminal body 12 with the terminal head 20.

The terminal head 20 comprises: a display 70, a touch-sensitive panel 72 overlying the display 70 and in registration therewith, a token reader (in the form of a dip card reader) 74, and an encrypting keypad (PINpad) 76.

The arm 60 also includes a receipt printer (not shown) mounted within the channel (not shown) and defines a receipt aperture 78 through which a customer can receive a transaction receipt or a mini statement.

In this embodiment, the terminal head 20 is oriented at an angle to vertical of approximately 30 degrees, to provide an improved customer experience when using the terminal head 20; however, the angle selected is not critical.

The display 70, touch-sensitive panel 72, dip card reader 74, and encrypting PINpad 76 comprise the user interface elements at the transaction request area 22, and are located on the same plane 80 (referred to as the request plane).

The request plane 80 is transverse to the fulfillment plane 40. In this embodiment, the angle between the request plane 80 and the fulfillment plane 40 is approximately 90 degrees.

The terminal head 20 includes a privacy shield 82 transverse to the request plane 80. In this embodiment, the privacy shield 82 comprises an opaque thermoplastic panel. The privacy shield 82 is disposed orthogonally to the request plane 80.

The operation of this ATM 10 will now be described. Initially, a customer 90 (best seen in FIG. 3 or 4) approaches the ATM 10 (either on foot or in a wheelchair), and faces the terminal head 20. The customer 90 inserts a bank card into the dip reader 74, and selects a transaction option presented on the display 70 using the touch sensitive panel 72.

The customer then enters his/her PIN via the encrypting PINpad 76, and the terminal head 20 transmits the transaction information (encrypted PIN, account number read from card, transaction selection, transaction amount, and the like) to a controller (not shown) in the terminal body 12. In this example, the transaction is cash withdrawal.

The controller (not shown) obtains authorization for the requested transaction in the conventional manner, and then presents a screen on the display 70 inviting the customer 90 to complete the transaction at the transaction fulfillment area 14 (in this example, by retrieving the requested amount of cash from the cash dispense aperture 32).

Once the customer 90 has retrieved his/her cash, the transaction is complete.

If, however, a customer requires assistance during a transaction, then the customer can ask a teller 92 (best seen in FIGS. 3 to 5) by speaking over the upper surface 42 of the terminal body 12 (or by pressing a help key (not shown) on the terminal head display 70). Speaking over the upper surface 42 is a natural interaction because the customer can face the teller 92 without leaving the ATM 10. If needed, the teller 92 can walk around to the ATM 10 to assist the customer.

If a customer does not wish to complete a transaction himself/herself, then the customer can perform part of the transaction, for example, by selecting the transaction type and amount, or by identifying himself or herself at the terminal head 20, and then ask the teller to complete the transaction. Alternatively, the customer may provide the teller with some identification (for example, a drivers' license). When the teller confirms the customer's identity, the teller may then activate the terminal head 20 for use by the customer. This allows the ATM 10 to be used for an assisted service transaction.

Reference will now be made to FIGS. 4 and 5, which illustrate a bank branch 100 including two ATMs 110, both of which are very similar to ATM 10. The main difference between ATM 110 and ATM 10 is that in ATM 110 the terminal head 20 is mounted at a different angle to the terminal body 12,112 than for ATM 10. This is achieved using an angled arm 116 that couples to the sidecar 50 at an oblique angle (in this embodiment approximately 135 degrees). This creates a slightly larger customer zone 124 and orients the customer 90 towards the teller 92. An L-shaped privacy shield 126 is mounted to a teller counter 128 into which each ATM body 12 is integrated.

As shown in FIGS. 4 and 5, the ATMs 110 are integrated into the bank branch 100. The safe 26 is located behind a wooden (or wood effect) front surface 142 defining a window through which a fascia 144 of the ATM 110 protrudes. The teller counter 128 provides an upper surface under which the safe 26 is located. Being able to speak directly to a teller when using the ATM 10 or 110 may encourage people to use the ATM 10 or 110 who would not wish to use a conventional ATM.

In addition, a customer in a wheelchair can gain easy access to the terminal head 20 by locating his/her knees in the knee well 62 beneath the terminal head 20.

It should be appreciated that instead of incorporating the terminal body 12 into a teller counter, the terminal body 12 may be provided as an island (around which customers may walk) in a bank branch. Alternatively, the terminal body 12 may be incorporated into a vertical wall, with the fascia 30 protruding through the wall.

Furthermore, where multiple self-service terminals are incorporated into a teller counter, the self-service terminals may not be identical. For example, in the dual handed teller counter 228 shown in the plan view of FIG. 6, one SST 10 may be configured for use by a right-handed person; whereas, an adjacent SST 210 may be configured for a left-handed person.

Figure 6:
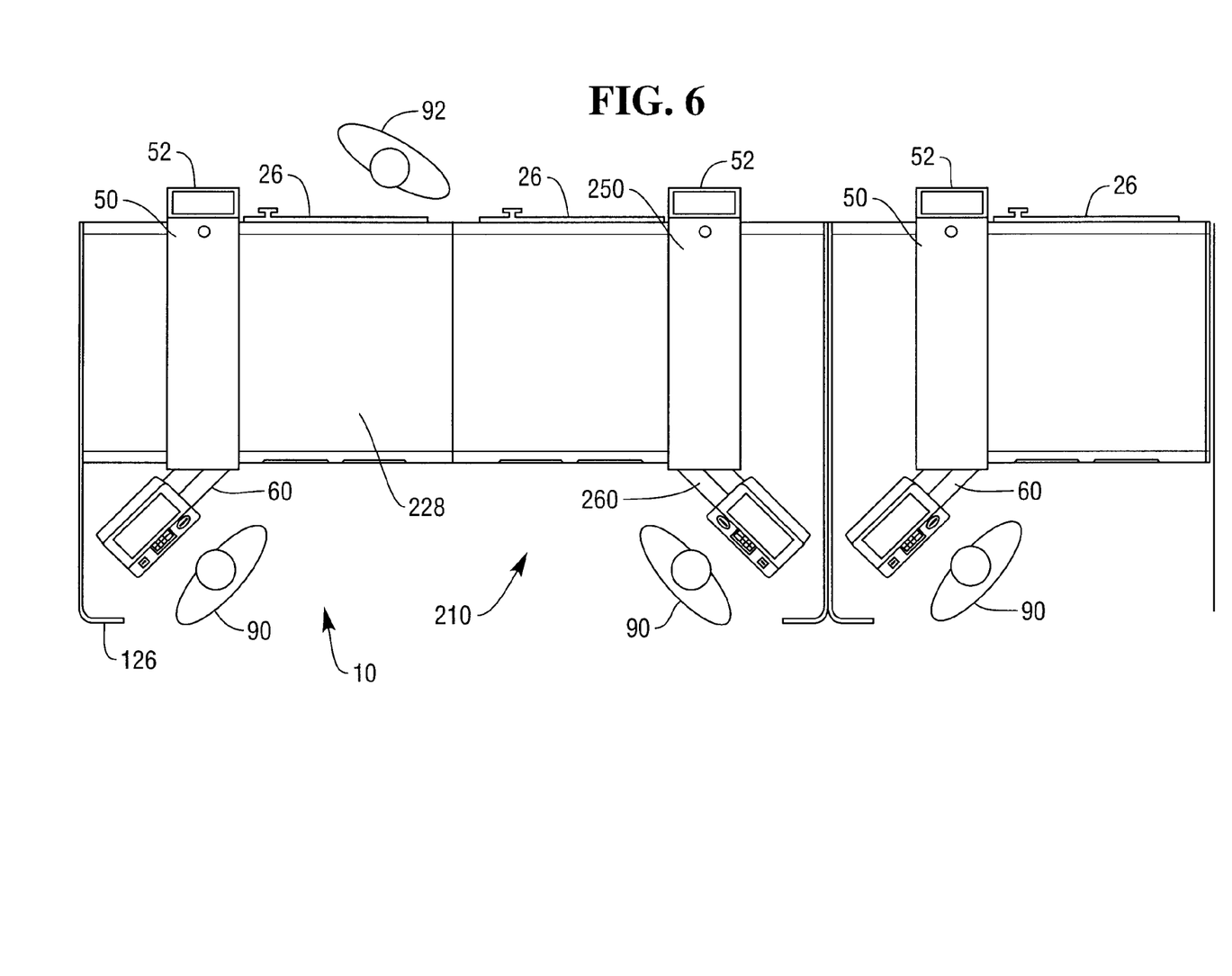
FIG. 6 is a plan view of a bank teller area incorporating three terminals similar to the type shown in FIG. 1.

The main difference between the right-handed (RH) SST 10 and the left-handed (LH) SST 210 is that the RH SST 10 includes a sidecar 50 mounted on the right side (when viewed from the teller position) of the safe 26; whereas, the LH SST 210 includes a sidecar 250 mounted on the left side (when viewed from the teller position) of the safe 26.

Another difference is that the LH SST 210 has a slightly different arm 260 (the mirror image of the arm 60).

The dispense aperture 32 and the deposit aperture 34 are identical, so the position of a cash dispense module (not shown) and a cash deposit module (not shown) mounted within the safe 26 may be exchanged, if desired, so that the dispense aperture 32 is always nearest the terminal head 20.

Figure 7:
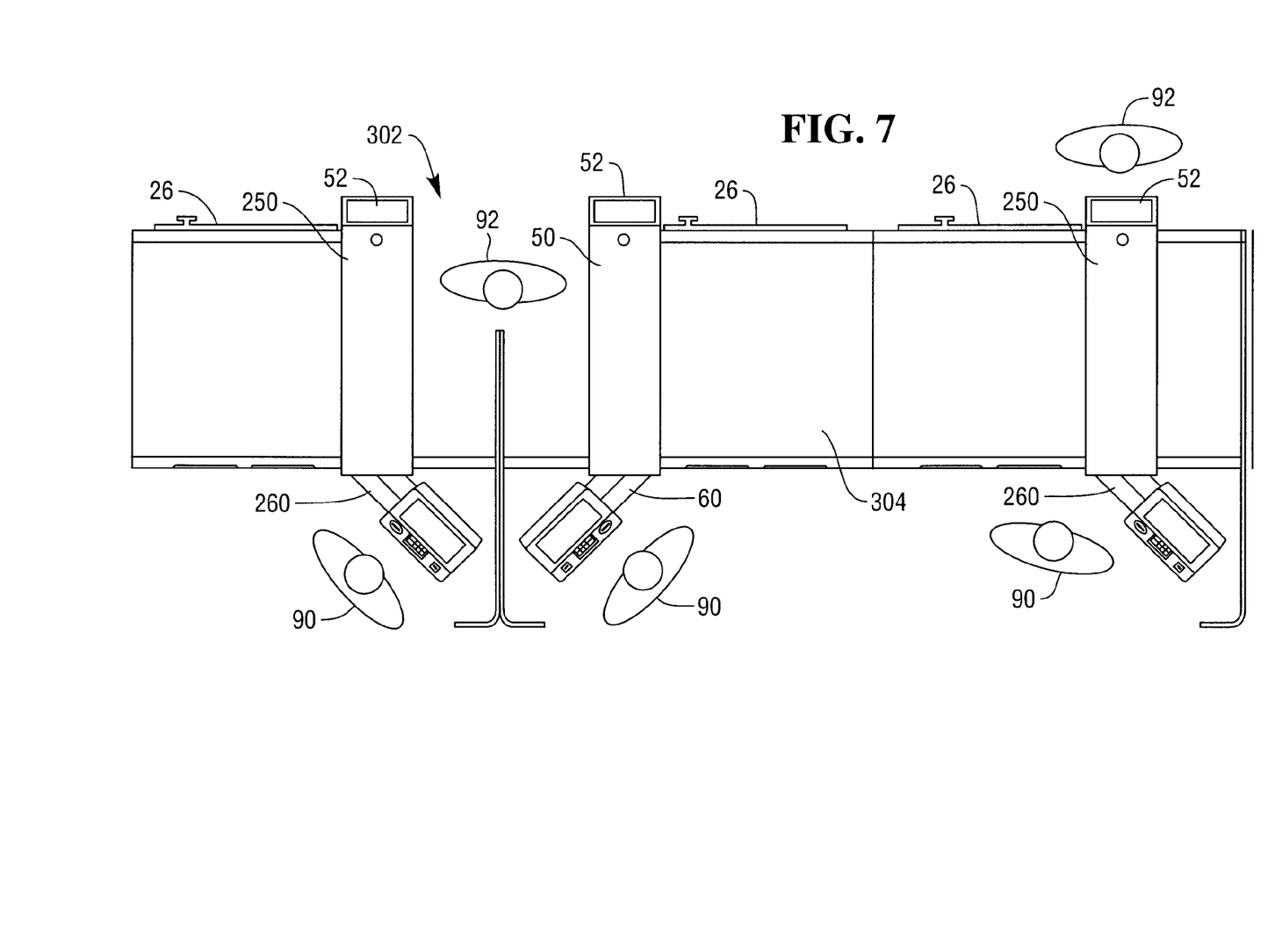
FIG. 7 is a plan view of another bank teller area incorporating three terminals similar to the type shown in FIG. 1.
Figure 8:
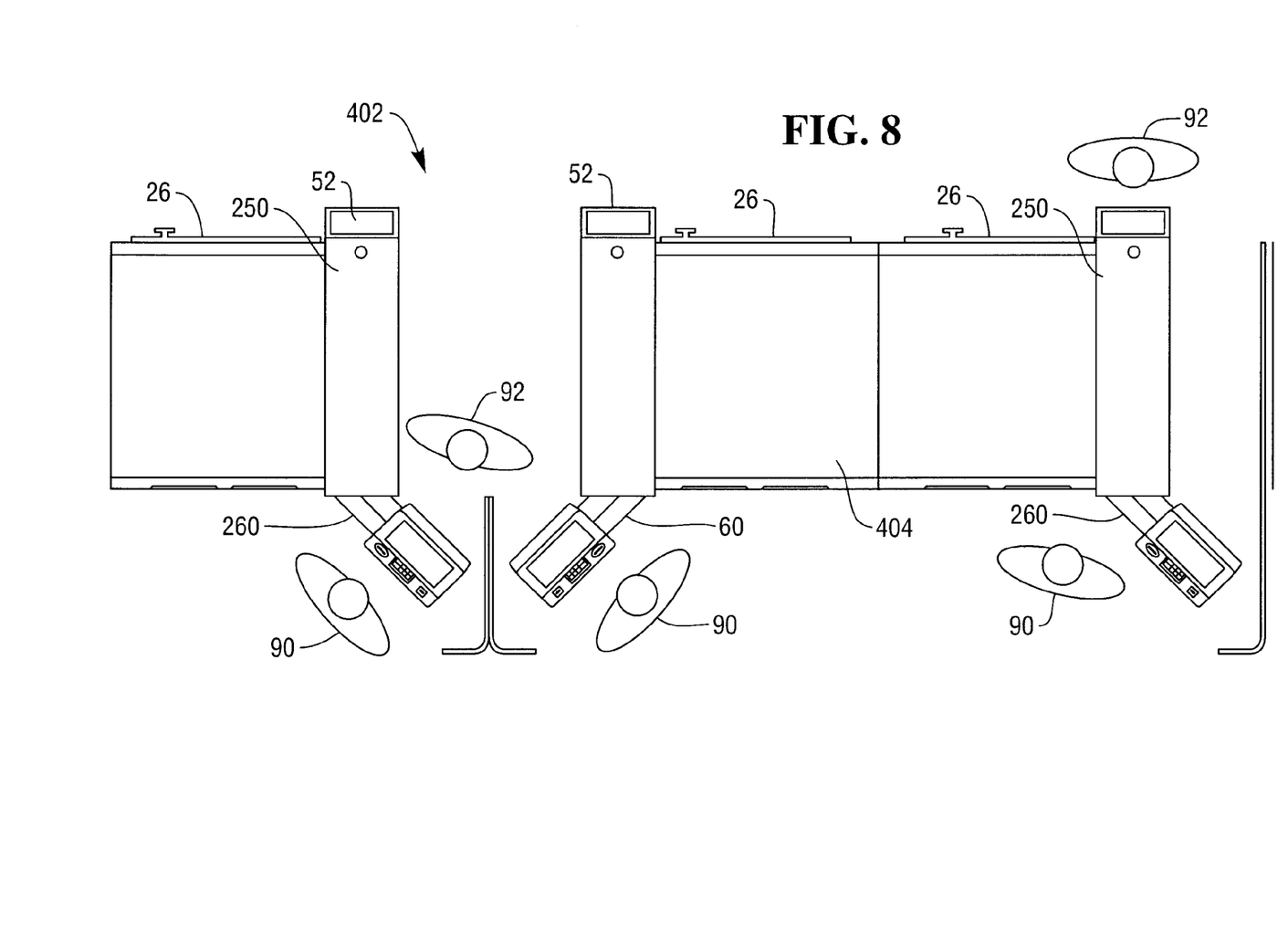
FIG. 8 is a plan view of yet another bank teller area incorporating three terminals similar to the type shown in FIG. 1.

To increase usability, a recess 302 may be provided in a teller counter 304, as shown in the plan view of FIG. 7, to allow the teller 92 to come closer to the customers 90 to help them with their transactions. Alternatively, a recess 402 may extend the full depth of a teller counter 404, as shown in the plan view of FIG. 8.

It should be appreciated that in these embodiments no media is transferred from the terminal body to the terminal head; the only transfer is of signals and power. This means that there is less likelihood of failure than if media items had to traverse the arm. Furthermore, the terminal body 12 is very similar to a convention ATM safe, so it is inexpensive to add a sidecar 50, an arm 60 and a terminal head 20 to create ATM 10.

Various modifications may be made to the above described embodiments within the scope of the invention; for example, in other embodiments, the token reader may comprise a motorized or swipe card reader, a near field communications (NFC) reader, or the like.

In other embodiments, the terminal head may include a pivot to enable a customer to change the vertical angle, or the terminal head may be fixed at a different vertical angle to that described above.

In other embodiments, the terminal head may be adjustable horizontally to allow the customer to change the angle between the request plane and the fulfillment plane, or the terminal head may be fixed at a different angle to the terminal body to those angles specified above.

In other embodiments, the terminal head 20 may include a ground support (such as a stand) or may be suspended from a ceiling.

The steps of the methods described herein may be carried out in any suitable order, or simultaneously where appropriate.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A self-service terminal comprising:
a terminal body having a substantially vertical transaction surface with a transaction fulfillment area containing apertures operable to receive and dispense transaction media, and
a terminal head extending substantially horizontally from the substantially vertical transaction surface and including a display having a display surface oriented generally vertically and transverse to the substantially vertical transaction surface, the display operable to electronically display transaction information;
wherein the terminal head is coupled to the terminal body by an arm extending transversely and substantially horizontally from the substantially vertical transaction surface; and wherein the self-service terminal is operable to process a financial transaction.

2. A self-service terminal according to claim 1, wherein the terminal body comprises a security enclosure defining apertures for media transfer.

3. A self-service terminal according to claim 2, wherein the security enclosure is encased by a fascia defining the apertures of the fulfillment area, and wherein the apertures of the fulfillment area are closable and aligned with the apertures for media transfer.

4. A self-service terminal according to claim 1, wherein the terminal body is approximately waist-high for an average adult person, and provides an upper surface that can be used as a table surface.

5. A self-service terminal according to claim 1, wherein the terminal head is cantilevered from the terminal body.

6. A self-service terminal according to claim 1, wherein the arm defines a channel, and includes power and signal wires routed therethrough to connect a power supply in the terminal body with the terminal head.

7. A self-service terminal according to claim 6, wherein the arm houses a receipt printer and defines a receipt aperture through which receipts are provided to a customer.

8. A self-service terminal according to claim 1, wherein the terminal head further comprises: a touch-sensitive panel overlying the display and in registration therewith, a token reader, and an encrypting keypad.

9. A self-service terminal according to claim 1, wherein the terminal head is oriented at an angle to vertical.

10. A self-service terminal according to claim 1, wherein the terminal head provides a transaction request area in substantially one plane, transverse to the substantially vertical transaction surface, and the terminal head is adjustable horizontally to allow a customer to change the angle between the one plane and the surface.

11. A method of providing a transaction at a self-service terminal, the method comprising:
receiving financial transaction instructions at a transaction request area of a terminal head through a touch-sensitive panel overlying a display of the terminal head and in registration therewith;
conveying the received transaction instructions to a terminal body through an arm extending transversely and substantially horizontally between the terminal head and the terminal body;
obtaining authorization for the transaction; and
fulfilling the transaction at a transaction fulfillment area of the terminal body, where the transaction fulfillment area includes apertures operable to receive and dispense transaction media and is within a substantially vertical transaction surface of the terminal body, and wherein the display has a display surface oriented generally vertically and transverse to the substantially vertical transaction surface; operable to electronically display the transaction information.

12. A method according to claim 11, wherein the method comprises the further step of providing an indication on the transaction request area to direct a customer to the transaction fulfillment area to fulfill the transaction.

13. A bank branch comprising:
a plurality of self-service terminals according to claim 1, each self-service terminal body being integrated into a teller position.

14. A self-service terminal comprising:
a terminal body defining a transaction fulfillment area containing apertures operable to receive and dispense transaction media, and
a terminal head including a display device operable to electronically display transaction information extending from the terminal body and defining a transaction request area transverse to the transaction fulfillment area to create a customer zone defined on one side by the transaction fulfillment area and on another side by the transaction request area;
wherein the terminal head is coupled to the terminal body by an arm extending transversely and substantially horizontally from the terminal body;
wherein the arm defines a channel, and includes power and signal wires routed therethrough to connect a power supply in the terminal body with the terminal head; and
wherein the arm houses a receipt printer and defines a receipt aperture through which receipts are provided to a customer; and wherein the self-service terminal is operable to process a financial transaction.

* * * * *